(12) United States Patent
Mitani et al.

(10) Patent No.: US 11,935,341 B2
(45) Date of Patent: Mar. 19, 2024

(54) DATA STORAGE DEVICE AND NON-TRANSITORY TANGIBLE COMPUTER READABLE STORAGE MEDIUM

(71) Applicant: DENSO CORPORATION, Kariya (JP)

(72) Inventors: Akira Mitani, Kariya (JP); Xin Xu, Kariya (JP)

(73) Assignee: DENSO CORPORATION, Kariya (JP)

( * ) Notice: Subject to any disclaimer, the term of this patent is extended or adjusted under 35 U.S.C. 154(b) by 782 days.

(21) Appl. No.: 16/920,816

(22) Filed: Jul. 6, 2020

(65) Prior Publication Data
US 2021/0012591 A1 Jan. 14, 2021

(30) Foreign Application Priority Data
Jul. 8, 2019 (JP) .................. 2019-127114

(51) Int. Cl.
*G07C 5/08* (2006.01)
*G06F 3/06* (2006.01)
*H04L 9/00* (2022.01)
*H04L 9/32* (2006.01)

(52) U.S. Cl.
CPC ............ *G07C 5/085* (2013.01); *G06F 3/062* (2013.01); *G06F 3/0655* (2013.01); *G06F 3/0679* (2013.01); *H04L 9/3236* (2013.01); *H04L 9/50* (2022.05)

(58) Field of Classification Search
CPC ......... G07C 5/085; H04L 9/50; H04L 9/3236; G06F 3/062; G06F 3/0655; G06F 3/0679

USPC ......................................................... 706/62
See application file for complete search history.

(56) References Cited

U.S. PATENT DOCUMENTS

2021/0365202 A1* 11/2021 Shin ..................... G06F 3/064

FOREIGN PATENT DOCUMENTS

| JP | 2007-141213 A | 6/2007 | |
| JP | 6340120 B1 * | 6/2018 | ......... G06F 16/1824 |

OTHER PUBLICATIONS

JP-6340120-B1 (Jun. 6, 2018) (Machine Translation) (Year: 2018).*

* cited by examiner

*Primary Examiner* — Mahmoud Gimie
(74) *Attorney, Agent, or Firm* — Harness, Dickey & Pierce, P.L.C.

(57) ABSTRACT

A data storage device in a mobile body defines a normal world and a secure world and stores a data acquired in the mobile body using a blockchain. The data storage device includes: a normal storage processing unit that stores an acquired data in a storage area of the normal world; a block generator that generates a new block including a hash value based on a last block coupled at last to the blockchain, and a hash value based on the acquired data; and a secure storage processing unit that stores a hash value based on the new block as a block hash value in a storage area of the secure world.

11 Claims, 7 Drawing Sheets

DATA STORAGE DEVICE AND NON-TRANSITORY TANGIBLE COMPUTER READABLE STORAGE MEDIUM

CROSS REFERENCE TO RELATED APPLICATION

The present application claims the benefit of priority from Japanese Patent Application No. 2019-127114 filed on Jul. 8, 2019. The entire disclosure of the above application is incorporated herein by reference.

TECHNICAL FIELD

The present disclosure relates to a technique for data storage for storing acquired data acquired in movable bodies.

BACKGROUND

In a conceivable technique, a drive recorder includes recording means for receiving and recording information about driving of a vehicle, and non-volatile recording means for recording the driving information recorded in the recording means, into a recording medium such as a flash memory, in a non-volatile manner, when a predetermined condition is satisfied.

SUMMARY

According to an example embodiment, a data storage device in a mobile body defines a normal world and a secure world and stores a data acquired in the mobile body using a blockchain. The data storage device includes: a normal storage processing unit that stores an acquired data in a storage area of the normal world; a block generator that generates a new block including a hash value based on a last block coupled at last to the blockchain, and a hash value based on the acquired data; and a secure storage processing unit that stores a hash value based on the new block as a block hash value in a storage area of the secure world.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In recent years, there has been increased importance of acquired data acquired in movable bodies such as vehicles. However, in the drive recorder in a conceivable technique, access to the recording medium from the outside is not restricted. This has caused the possibility of unsecured reliability of data such as driving information which is stored therein.

In view of the above points a data storage device and a data storage program are provided to be capable of storing acquired data acquired in a mobile body, while ensuring the reliability thereof.

According to an aspect of an example embodiment, a data storage device in a mobile body (A) for defining a normal world and a secure world where access from the normal world (NW) is restricted and for storing a data acquired in the mobile body using a blockchain, the data storage device includes: a normal storage processing unit that is configured to store an acquired data in a storage area of the normal world; a block generator that is configured to generate a new block including a hash value based on a last block coupled at last to the blockchain, and a hash value based on the acquired data; and a secure storage processing unit that is configured to store a hash value based on the new block as a block hash value in a storage area of the secure world.

According to another aspect of an example embodiment, a data storage program in a mobile body for defining a normal world and a secure world where access from the normal world is restricted, and for storing a data acquired in the mobile body using a blockchain, the data storage program causing at least one processor to execute instructions, the instruction includes: storing an acquired data in a storage area of the normal world; generating a new block including a hash value based on a last block coupled at last to the blockchain, and a hash value based on the acquired data; and storing a hash value based on the new block as a block hash value, in a storage area of the secure world.

In the aforementioned aspects, the hash value for the new block which is newly coupled to the blockchain is stored, as the block hash value, in the storage area in the secure world where access from the normal world is restricted. This enables detecting alteration and the like in the acquired data acquired in the mobile body, through comparison using the block hash value protected in the secure world. This enables storing the acquired data acquired in the mobile body, while ensuring the reliability thereof.

First Embodiment

Figure 1:
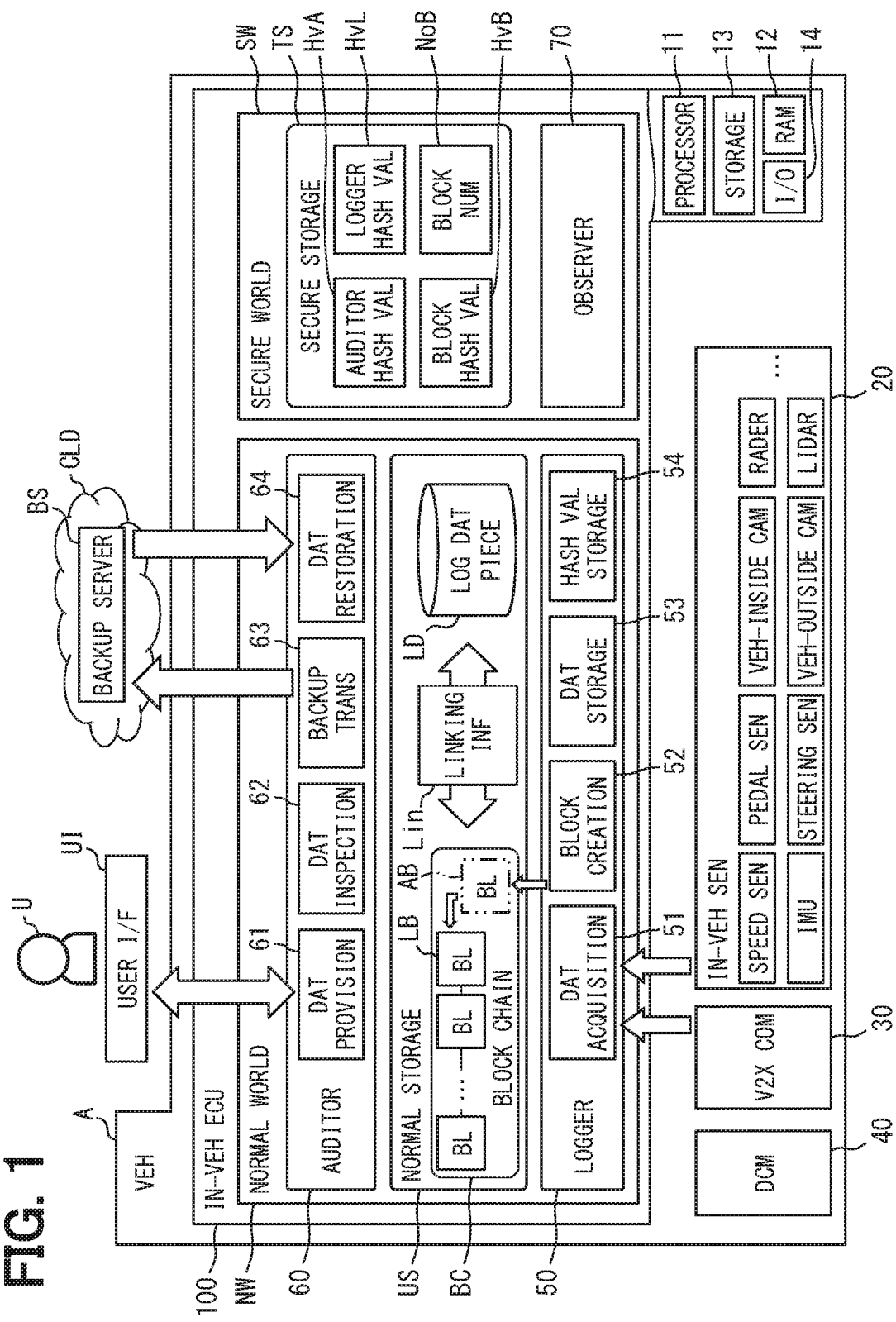
FIG. 1 is a block diagram illustrating an electric structure of an in-vehicle ECU according to a first embodiment of the present disclosure, together with in-vehicle structures relating thereto.

FIG. 1 illustrates functions of a data storage device according to a first embodiment of the present disclosure, in which these functions are implemented in an in-vehicle ECU (Electronic Control Unit) 100. The in-vehicle ECU 100 is one of multiple electronic control units incorporated in a vehicle A. The in-vehicle ECU 100 may be either a body-system integrated ECU or an automatic-driving ECU for automatic driving or high-level driving assistance, for example. The in-vehicle ECU 100 may also be a dedicated ECU for storing acquired data. The in-vehicle ECU 100 is electrically connected to a DCM 40, a V2X communication unit 30, multiple in-vehicle sensors 20, and the like, directly or indirectly.

The DCM (Data Communication Module) 40 is a communication module incorporated in the vehicle A. The DCM 40 transmits and receives radio waves to and from base stations around the vehicle A, through wireless communication conforming to communication standards, such as LTE (Long Term Evolution) and 5G.

The DCM 40 enables cooperation between a cloud CLD and in-vehicle apparatuses (Cloud to Car). The vehicle A is made to be a connected car which can be connected to the Internet, due to the DCM 40 incorporated therein. The DCM 40 transmits backup of data stored in the in-vehicle ECU 100, to a backup server (backup storage device or a backup memory) BS installed in the cloud CLD. In addition, the DCM 40 receives backup data stored in the backup server BS.

The V2X (Vehicle to Everything) communication unit 30 is an in-vehicle communication device for realizing vehicle-to-vehicle communications, road-to-vehicle communications, pedestrian-to-vehicle communications, and the like. When there exist an in-vehicle unit incorporated in another vehicle, a road-side apparatus installed on a road, a portable terminal carried by a pedestrian, or the like, within a communication range, the V2X communication unit 30 can bidirectionally communicate with these communication structures. The V2X communication unit 30 is capable of providing communication data acquired through communication, to the in-vehicle ECU 100, through a communication bus and the like in an in-vehicle communication network, for example.

The in-vehicle sensors 20 are various types of detection structures incorporated in the vehicle A. The in-vehicle sensors 20 include a vehicle-speed sensor and an inertia sensor (Inertial Measurement Unit, IMU) for detecting running conditions of the vehicle A. The in-vehicle sensors 20 include a vehicle-inside camera, a pedal sensor and a steering sensor for detecting driver's conditions and driving operations. The in-vehicle sensors 20 include a vehicle-outside camera, a millimeter-wave radar and a lidar for use in driving assistance or automatic driving. The in-vehicle sensors 20 each are capable of providing detection data to the in-vehicle ECU 100, through communication buses and the like in the in-vehicle communication network, for example.

The in-vehicle ECU 100 is an in-vehicle computer adapted to acquire data generated (i.e., created) in the vehicle A and to accumulate the acquired data as log data pieces LD, in the state of making it difficult to alter the acquired data. The in-vehicle ECU 100 is mainly constituted by a control circuit including a processor 11, a RAM 12, a storage portion 13, an input/output interface 14, and the like.

The processor 11 is hardware for operational processing, which is coupled to the RAM 12, and the processor 11 is capable of executing various types of programs through processing for accessing the RAM 12. The storage portion 13 includes a non-volatile storage medium and stores various types of programs to be executed by the processor 11. The storage portion 13 stores at least data storage programs relating to accumulation, provision and monitoring of log data pieces LD generated in the vehicle A.

The in-vehicle ECU 100 defines, in a system, at least two different processing areas, which are referred to as a normal world NW and a secure world SW. The normal world NW and the secure world SW may either be physically separated from each other in hardware or be virtually separated from each other through cooperation of hardware and software. The in-vehicle ECU 100 temporally separates resources necessary for the execution of applications, in the normal world NW and the secure world SW, by utilizing the functions of context switches and the like.

The normal world NW is a normal area for executing operation systems and applications. The normal world NW is provided with a normal storage US, as a storage area (Untrusted Storage) for storing data.

The secure world SW is an area isolated from the normal world NW. In the secure world SW, secure operation systems and applications for processing required to have security are executed. Access to the secure world SW from the normal world NW is restricted by a function of the processor 11. This makes it impossible to recognize the presence of the secure world SW from the normal world NW, which ensures security of processing executed in the secure world SW, information stored in the secure world SW, and the like. The secure world SW is provided with a secure storage TS, as a storage area (Trusted Storage) for storing data. The capacity of the secure storage TS may be smaller than the capacity of the normal storage US.

Figure 6:
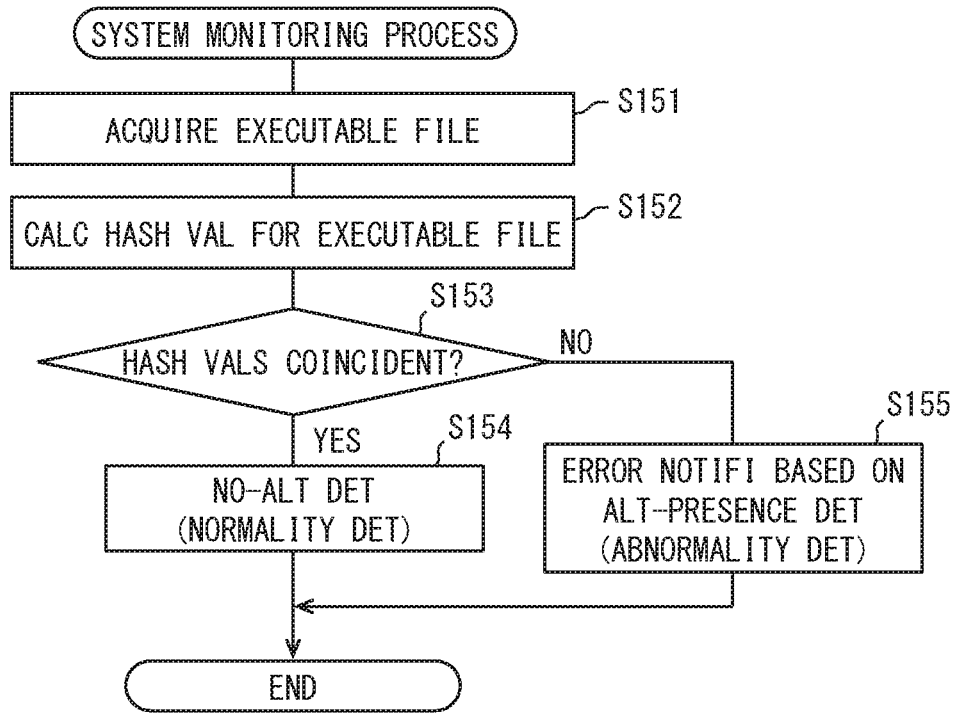
FIG. 6 is a flow chart illustrating details of system monitoring processing executed by an observer and FIG. 7 is a block diagram illustrating an electric structure of an in-vehicle ECU according to a second embodiment of the present disclosure.

The in-vehicle ECU 100 executes logger processing (see FIG. 3) for storing log data pieces LD, data provision processing (see FIG. 4) for providing log data pieces LD accumulated through the logger processing to the outside, system monitoring processing (see FIG. 6) for monitoring conditions of the system, and the like. The in-vehicle ECU 100 is provided with a logger 50 and an auditor 60 which operate in the normal world NW, and an observer 70 which operates in the secure world SW, as functional units for executing the aforementioned respective processing.

The logger 50 is a functional unit adapted to store various types of data generated in the vehicle A, in association with a blockchain BC, through the execution of the logger processing. The logger 50 includes functional portions, such as a data acquisition portion 51, a block generation portion (i.e., a block creation portion, block creator or a block generator) 52, a data storage portion 53, a hash-value storage portion 54, and the like.

The data acquisition portion 51 is electrically connected to communication buses in the in-vehicle communication network, for example. The data acquisition portion 51 is capable of acquiring various types of data generated in the vehicle A, such as communication data and detection data, through the communication buses. The data acquisition portion 51 extracts data pre-determined to be extracted, out of the data which has been successively output to the communication buses through the in-vehicle sensors 20 and the V2X communication unit 30. Further, the data acquisition portion 51 selectively acquires the extracted data as acquired data to be stored.

Figure 2:
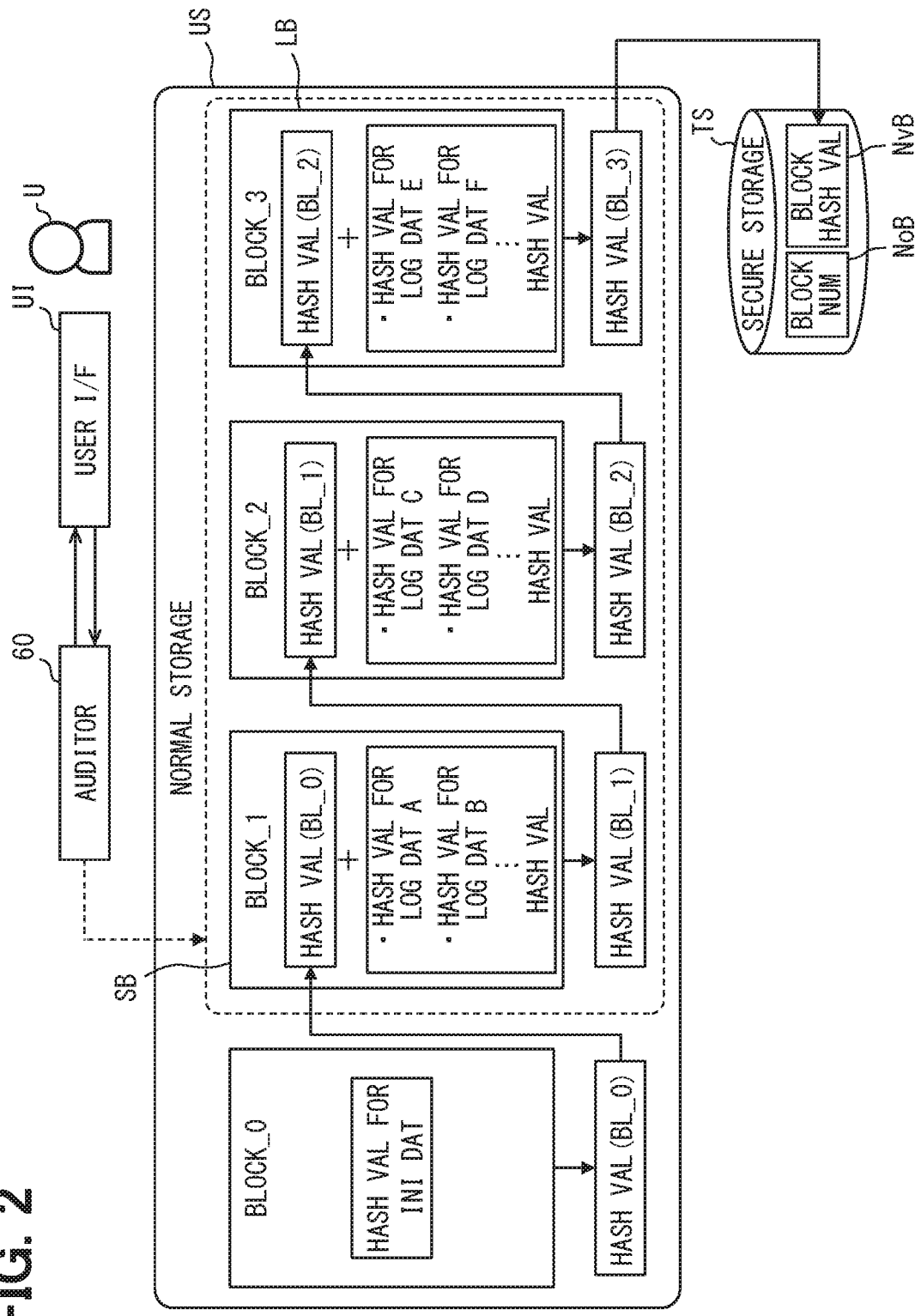
FIG. 2 is a view illustrating details of a blockchain.

The block generation portion 52, which is illustrated in FIGS. 1 and 2, stores the acquired data acquired by the data acquisition portion 51, as log data pieces LD. The block generation portion 52 has the function of calculating a hash value, by using a hash function such as SHA-256, for example. The block generation portion 52 converts the log data pieces LD into a data structure in the form of a hash chain, using the hash function. Further, the block generation portion 52 stores the data structure in the normal storage US. The block generation portion 52 generates a single block, based on a specified number of log data pieces LD or log data pieces LD having a specified capacity. The specified number or the specified capacity has been preliminarily determined. The block generation portion 52 inputs data in a single block to the hash function to provide a hash value and, further, the block generation portion 52 introduces the hash value into the next block, thereby generating a blockchain BC formed of a large number of blocks coupled to each other in a straight chain form.

The block generation portion 52 calculates hash values to be stored as main-body data in each block, based on the specified number of log data pieces LD or log data pieces LD having the specified capacity, which have been acquired by the data acquisition portion 51. The block generation portion 52 may either individually calculate the respective hash values for a large number of log data pieces LD or calculate a Merkle root for a large number of log data pieces LD.

The data storage portion 53 stores the log data pieces LD acquired by the data acquisition portion 51, in file paths specified in the normal storage US. The data storage portion 53 stores the data of the blockchain BC generated by the block generating portion 52, in the normal storage US. The data storage portion 53 stores linking information Lin for linking a certain block to the file path of the log data pieces LD included in the certain block, in the normal storage US.

The hash-value storage portion 54 is capable of updating a block hash value HvB and a block number NoB which are stored in the secure storage TS, by executing a predetermined command (for example, secure monitor call and the like) which enables access to the secure world SW. The block hash value HvB is a hash value based on the current last block LB in the blockchain BC. The block hash value HvB is data of 256 bits (character string), which is obtained as output from operational processing for inputting all the data in the last block LB to the hash function.

The block number NoB is a specific value assigned to the last block LB, which is a value indicating what number block is the current last block LB in the blockchain BC, assuming that the initial block is "0". The block number NoB is also a value indicating the number of the blocks which are currently coupled to the blockchain BC. The hash-value storage portion 54 updates the block hash value HvB and the block number NoB in the secure storage TS, every time the block generating portion 52 generates a new block AB and calculates the hash value therefor.

Figure 3:
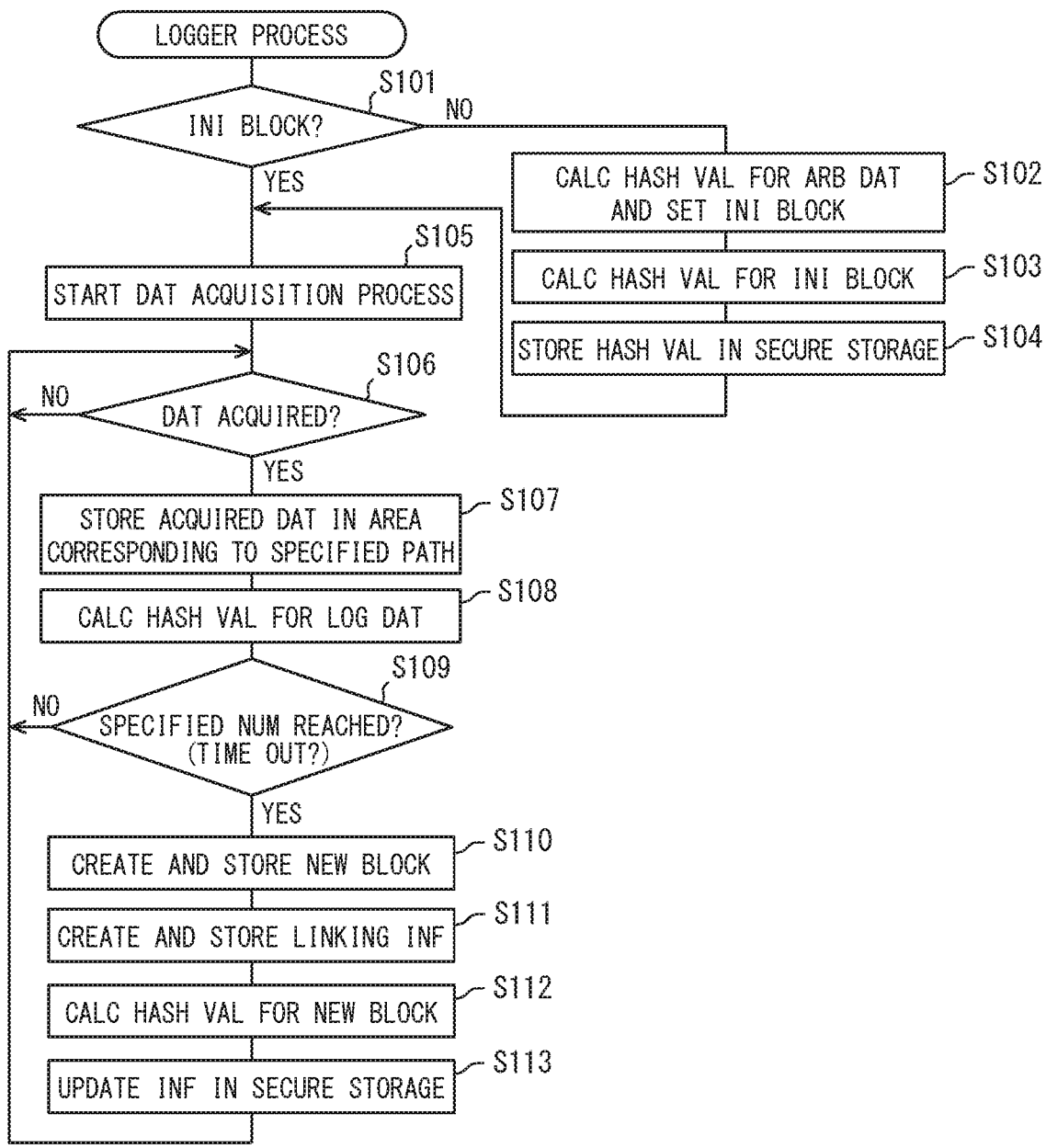
FIG. 3 is a flow chart illustrating details of logger processing executed by a logger.
Figure 4:
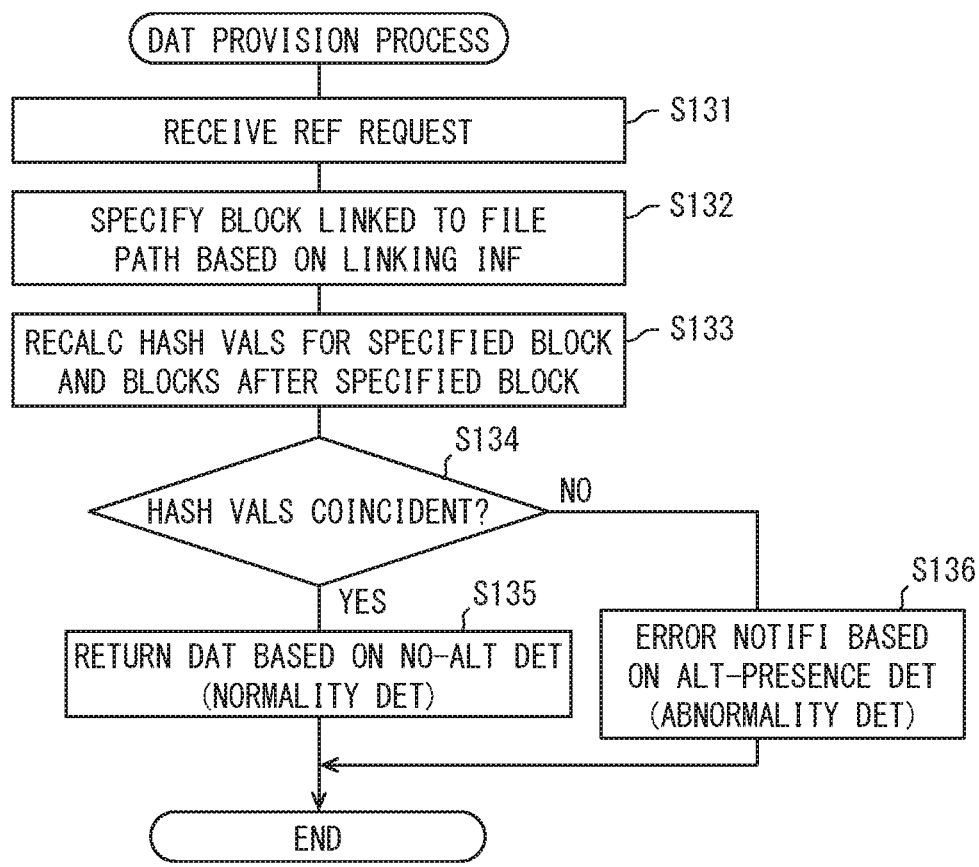
FIG. 4 is a flow chart illustrating details of data provision processing executed by an auditor.

Hereinafter, the logger processing performed by the aforementioned logger 50 will be described in detail, based on a flow chart illustrated in FIG. 3, with reference to FIGS. 1 and 2. The logger processing is started based on the start of supply of electric power to the in-vehicle ECU 100 and is continuously performed until the end of the supply of electric power.

In S101, it is determined whether or not an initial block in a blockchain BC has been already generated, in the normal storage US. If it is determined, in S101, that there exists an initial block, the processing proceeds to S105. On the other hand, if it is determined, in S101, that there exists no initial block, the processing proceeds to S102 for performing initial processing.

In S102, a hash value based on arbitrary data is calculated, and an initial block which stores the hash value is set, and the processing proceeds to S103. In S103, a hash value for the initial block set in S102 is calculated, and the processing proceeds to S104. In S104, the hash value calculated in S103 is stored as an initial value of the block hash value HvB in the secure storage TS, and the processing proceeds to S105. In addition, in S104, "0" as an initial value is recorded at an address in the secure storage TS at which the block number NoB is stored.

In S105, processing for acquiring data to be accumulated as log data pieces LD is started, and the processing proceeds to S106. In S106, it is determined whether or not acquired data to be stored has been acquired. If data to be stored has not been acquired, generation of the data is waited, through processing for repeating the determination in S106. Further, at the timing when data to be stored has been acquired through the communication buses, the processing proceeds to S107 from S106.

In S107, the acquired data is stored as a log data piece LD in a certain storage area in the normal storage US, according to a command about a file path, and the processing proceeds to S108. In S108, the hash value for the log data piece LD stored in S107 is calculated, and the processing proceeds to S109. In S107 and S108, the acquisition of a log data piece LD and the calculation of the hash value are successively executed, which temporally disperses the processing load.

In S109, it is determined whether or not the number or the capacity of log data pieces LD to be stored in a new block AB has reached a specified number or a specified capacity. If it is determined, in S109, that the number or the capacity of log data pieces LD has not reached the specified number or the specified capacity, the processing returns to S106, thereby continuing the collection of log data pieces LD. On the other hand, if it is determined, in S109, that the number or the capacity of log data pieces LD has reached the specified number or the specified capacity, the processing proceeds to S110. Also, in S109, the time period which has elapsed since the generation of the previous new block AB is counted, and the processing can proceed to S110, based on the elapse of a predetermined time period (time out).

In S110, by making a set of the hash value based on the current last block LB and the hash values for the log data pieces LD calculated in S108, the new block AB including at least these hash values is generated, and the processing proceeds to S111. The new block AB is stored in the normal storage US and is coupled as a new last block BC to the blockchain BC.

In S111, linking information Lin is generated, and the linking information Lin is stored in the normal storage US, and the processing proceeds to S112. The linking information Lin is information which links the new block AB generated in S110 to the file path which defines the storage destination of the log data pieces LD having the hash values included in the new block AB.

In S112, the hash value for the new block AB is calculated, and the processing proceeds to S113. In S113, the block hash value HvB in the secure storage TS is updated, with the hash value calculated in S112. In addition, in S113, the value of the block number NoB recorded in the secure storage TS is incremented and is made coincident with the block number of the new block AB. The aforementioned S106 to S113 are repeated, thereby realizing the storage of the log data pieces LD in association with the blockchain BC.

The auditor 60 illustrated in FIGS. 1 and 2 is a functional unit adapted to execute data provision processing (see FIG. 4) for providing log data pieces LD accumulated by the logger 50 to a user U, and data maintenance processing relating to backup and restoration of log data pieces LD. The auditor 60 includes a data provision portion 61 and a data inspection portion (i.e., a data verification portion or a data verifier) 62, as functional portions relating to the data provision processing.

The data provision portion 61 is capable of communicating with a user interface UI (see FIG. 5) outside the in-vehicle ECU 100, in a wireless manner or a wired manner. The user interface UI is constituted by a user terminal, such as an HMI apparatus incorporated in the vehicle A, a smart phone, a tablet terminal or a personal computer, for example. The user U inputs user's operations for referring to log data pieces LD, to the user interface UI. The user interface UI outputs a reference request to the data provision portion 61, based on the user's operations.

The data provision portion 61 receives the reference request output from the user interface UI. The reference request designates the file path of the log data pieces LD desired to be referred by the user U. The data provision portion 61 extracts the file path in the acquired reference request and notifies the data inspection portion 62 of the file path. If the result of the inspection by the data inspection portion 62 has no problem, the data provision portion 61 returns the log data pieces LD designated by the file path, to the user interface UI, which is the requestor (i.e., request source) of the reference request.

The data inspection portion 62 inspects or verifies abnormality, which includes the presence or absence of alteration, in the certain log data pieces LD (the requested data) which have been requested by the reference request, by using the block hash value HvB stored in the secure storage TS, by being triggered by the reception of the reference request from the data provision portion 61. The data inspection portion 62 specifies the block number linked to the file path designated by the reference request, based on the linking information Lin. The data inspection portion 62 re-calculates the respective hash values based on the log data pieces LD, for the specified block (which will be referred to as "a specified block SB" hereinafter) and for blocks newer than the specified block SB (see the range of a broken line in FIG. 2), in order to inspect the consistency of the blockchain BC.

The data inspection portion 62 determines abnormality of the log data pieces LD, based on whether or not the re-calculated hash value based on the last block LB coincides with the block hash value HvB stored in the secure storage TS. If the re-calculated hash value for the last block LB coincides with the block hash value HvB, the data inspection portion 62 determines that there is not abnormality such as alteration in the log data pieces LD. If the re-calculated hash value for the last block LB does not coincide with the block hash value HvB, the data inspection portion 62 determines that there may exist abnormality such as alteration in the log data pieces LD.

There will be further described, in detail, the data provision processing performed by the data provision portion 61 and the data inspection portion 62, which have been described above, based on a flow chart illustrated in FIG. 4, with reference to FIGS. 1 and 2. The data provision processing is started by the auditor 60, based on the reception of a reference request from the user interface UI.

In S131, a reference request transmitted from the user interface UI is received, and the processing proceeds to S132. In S132, based on the file path in the reference request acquired in S131 and linking information Lin stored in the normal storage US, the specified block SB linked to the file path is specified, and the processing proceeds to S133. The specified block SB is a block which stores the hash values for the log data pieces LD desired to be referred by the user U. In S133, for the specified block SB and the blocks coupled after the specified block SB, related log data pieces ID are read therefrom, and the hash values are re-calculated therefor, and the processing proceeds to S134.

In S134, it is determined whether or not the hash value for the last block LB which was re-calculated in S133 is coincident with the block hash value HvB stored in the secure storage TS. In S134, if it is determined that the hash value calculated at this time is coincident with the block hash value HvB, the processing proceeds to S135. In S135, normality determination is executed, thereby indicating that all the log data pieces LD used in the re-calculation in S133 have not been altered. In S135, based on this normality determination, a list of the log data pieces LD corresponding to the reference request is returned to the user interface UI, and the series of the data provision processing is completed.

On the other hand, if it is determined in S134 that the two hash values are not coincident with each other, the processing proceeds to S136. In S136, abnormality determination is executed, thereby indicating that some of the log data pieces LD used in the re-calculation in S133 may have been altered. In S136, based on this abnormality determination, an error notification is returned to the user interface UI, and the series of the data provision processing is completed.

Figure 5:
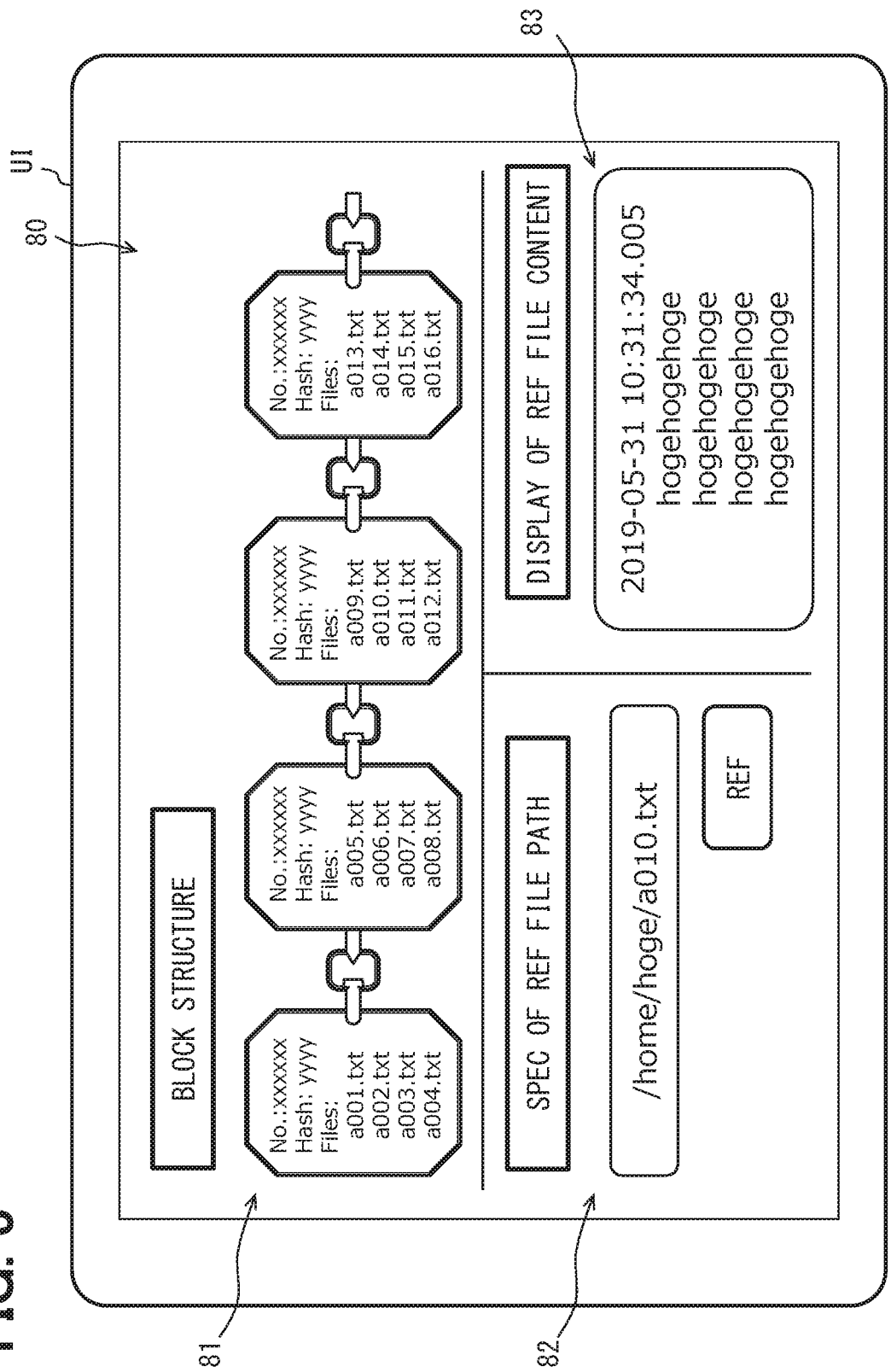
FIG. 5 is a view illustrating an example of a data provision screen displayed on a user interface.

The user interface UI displays a data provision screen 80 illustrated in FIG. 5, on a display, based on the response from the data acquisition portion 51 in S135 or S136. The data provision screen 80 is constituted by a block-structure display area 81, a file-path display area 82, a file-content display area 83, and the like.

The block-structure display area 81 is a display area adapted to schematically display, through images, the structure of the blockchain BC, and various types of information stored in the blockchain BC. The file-path display area 82 is a display area adapted to display the file path included in the reference request. The file-content display area 83 is a display area adapted to display the returned log data pieces LD. If an error notification is returned to the user interface UI, an error message and the like are displayed on the file-content display area 83.

The auditor 60 includes a backup transmission portion 63 and a data restoration portion (i.e., a data recovery portion or a data restorer) 64, as functional portions relating to the data maintenance processing, as illustrated in FIG. 1. The backup transmission portion 63 and the data restoration portion 64 are enabled to share log data pieces LD with the backup server BS, in cooperation with the DCM 40.

The backup transmission portion 63 detects a new block AB generated by the block generation portion 52. If a new block AB is generated by the block generation portion 52, the backup transmission portion 63 transmits backup data of a large number of the log data pieces LD having hash values stored in the new block AB, to the external backup server BS. The backup server BS stores the backup data transmitted from the backup transmission portion 63, in such a way as to link it to ID information about the in-vehide ECU 100, in a storage medium having a large capacity, such as a hard disk drive.

The backup transmission portion 63 withholds the transmission of the log data pieces LD to the backup server BS, in conditions where the DCM 40 is disabled from communication. In this case, at the timing when the DCM 40 has been restored to the state of being capable of communication, the backup transmission portion 63 resumes the transmission of the backup data which has not been transmitted yet.

The data restoration portion 64 detects abnormality determination executed by the data inspection portion 62. If abnormality such as alteration or defect occurs in the log data pieces LD and the data inspection portion 62 executes abnormality determination on log data pieces LD, the data restoration portion 64 restores the log data pieces LD, using the backup data stored in the backup server BS. The data restoration portion 64 requests the backup server BS to transmit the backup data, for the multiple log data pieces LD having the hash values introduced in the specified block SB (see FIG. 2) and the respective blocks after the specified block SB, which were inspected by the data inspection portion 62. Assuming that the backup data received from the backup server BS is normal log data pieces LD, the data restoration portion 64 overwrites the log data pieces LD designated by the file path, with the corresponding backup data. Also, the data restoration portion 64 may acquire all the backup data from the backup server SB and may perform processing for updating all the log data pieces LD.

The observer 70 is operated in the secure world SW and, therefore, is prevented from being altered from the outside of the in-vehicle ECU 100 and from the normal world NW. The observer 70 is a functional unit adapted to monitor the conditions of the logger 50 and the auditor 60 in the normal world NW, at regular time intervals, from the secure world SW.

The observer 70 starts the system monitoring processing (see FIG. 6), at a pre-defined cycle, in order to perform monitoring at regular time intervals. The observer 70 acquires, from the normal world NW, executable files for the logger 50, which are required for the execution of the logger processing, and executable files for the auditor 60, which are required for the execution of the data provision processing and the data maintenance processing (see S151 in FIG. 6).

In other words, the executable files for the logger 50 are executable files relating to the data acquisition portion 51, the block generation portion 52, the data storage portion 53, and the hash-value storage portion 54. Similarly, in other words, the executable files for the auditor 60 are executable files relating to the data provision portion 61, the data inspection portion 62, the backup transmission portion 63, and the data restoration portion 64. The observer 70 comprehensively acquires the entirety of the respective executable files. The executable files include binary files, for example. The executable files may further include compilers, linkers, libraries, and the like.

The observer 70 inputs the respective executable files to a hash function, in a pre-defined order, to calculate the hash value for the logger 50 and the hash value for the auditor 60 (refer to S152).

The secure storage TS stores hash values based on initial executable files which are ensured not to have been altered, as monitoring hash values. More specifically, a logger hash value HvL based on normal executable files for the logger 50, and an auditor hash value HvA based on normal executable files for the auditor 60 are stored as the monitoring hash values, in the secure storage TS. The logger hash value HvL and the auditor hash value HvA are stored in the secure storage TS and, therefore, are prevented from being altered by being accessed from the outside and the normal world NW.

The observer 70 determines whether or not the hash value based on the executable files for the logger 50, which has been acquired through the system monitoring processing at this time, is coincident with the logger hash value HvL stored in the secure storage TS (refer to S153). Similarly, the observer 70 determines whether or not the hash value based on the executable files for the auditor 60, which has been acquired at this time, is coincident with the auditor hash value HvA stored in the secure storage TS (refer to S153).

If the observer 70 determines that the respective hash values calculated at this time for the logger 50 and the auditor 60 are coincident with the respective monitoring hash values HvL and HvA, the observer 70 executes normality determination indicating that the respective executable files have not been altered (refer to S154). On the other hand, if the observer 70 determines that at least one of the respective hash values calculated at this time is not coincident with the respective monitoring hash values HvL and HvA, the observer 70 executes abnormality determination indicating that the executable files may have been altered (refer to S155). In this case, an error notification is issued to the user U, and the series of the system monitoring processing is completed.

In the first embodiment described above, the hash value for the new block AB which is newly coupled to the blockchain BC is stored as the block hash value HvB in the secure storage TS where access from the normal world NW is restricted. This enables detecting alteration and the like in log data pieces LD acquired in the vehicle A, through the comparison using the block hash value HvB which is protected by the secure world SW.

More specifically, the hash values of the individual log data pieces LD are introduced in the blockchain BC and, therefore, even if only one of the log data pieces LD is changed, this causes the last block hash value HvB to be changed. Therefore, if only the block hash value HvB is protected, alteration in all the log data pieces LD can be detected, based on collation with the block hash value HvB.

This enables storing log data pieces LD acquired in the vehicle A, while ensuring the reliability thereof.

In addition, in the first embodiment, linking information Lin relating to the linkage of the log data pieces LD to the blockchain BC is stored in the normal storage US. Therefore, in response to a reference request from the user interface UI, a specified block SB relating to the requested log data pieces LD can be immediately specified, based on the linking information Lin. The aforementioned structure enables easily ensuring usability for the user U who refers to log data pieces LD.

In the first embodiment, if a reference request for certain log data pieces LD is received, the data inspection portion 62 inspects the presence or absence of alteration in the requested log data pieces LD. For the inspection for alteration, the block hash value HvB stored in the secure storage TS is used. Since the inspection about the possibility of alternation in log data pieces LD is performed every time a reference request is received, as described above, it is possible to properly ensure the reliability of log data pieces LD supplied to the user interface UI.

In the first embodiment, the data inspection portion 62 re-calculates the hash values for the specified block SB and the blocks coupled after the specified block SB. If the hash value for the last block LB is coincident with the block hash value HvB in the secure storage TS, the data inspection portion 62 determines that there is no alteration therein. Through this processing, it is possible to accurately inspect the presence or absence of alternation in a large amount of log data pieces LD, while reducing the capacity of data stored in the secure storage TS.

In addition, in the first embodiment, the logger 50 and the auditor 60 are operated in the normal world NW. This can reduce the consumption of the resource of the secure world SW.

In the first embodiment, the observer 70 operates in the secure world SW and determines the presence or absence of alternation in the respective executable files for the logger 50 and the auditor 60. With the aforementioned structure, even though the logger 50 and the auditor 60 are operated in the normal world NW, their normal operations are secured by the observer 70 which operates in the secure world SW. With the aforementioned structure, it is possible to effectively utilize the resource of the in-vehicle ECU 100, while ensuring the reliability of log data pieces LD.

In the first embodiment, the logger hash value HvL and the auditor hash value HvA based on the respective normal executable files for the logger 50 and the auditor 60 are stored in the secure world SW. The observer 70 determines that the executable files have not been altered, if the hash values based on the respective current executable files are coincident with the respective monitoring hash values HvL and HvA. Through this processing, it is possible to accurately inspect the presence or absence of alteration in the respective executable files which tend to have larger capacities, while reducing the capacity of data stored in the secure storage TS.

In addition, in the first embodiment, log data pieces LD are transmitted to the backup server BS provided outside the in-vehicle ECU 100 and are stored as backup data in the backup server BS. If abnormality occurs in the log data pieces LD stored in the in-vehicle ECU 100, the log data pieces LD in the in-vehicle ECU 100 are restored, using the backup data stored in the backup server BS. Since the means for restoration through backup is ensured as described above, even though log data pieces LD are stored in the normal storage US, it is possible to ensure the reliability thereof.

In the first embodiment, the vehicle A corresponds to "a mobile body", the backup server BS corresponds to "a storage device", and the user interface UI corresponds to "a requestor". The normal storage US corresponds to "a storage area in a normal world", the secure storage TS corresponds to "a storage area in a secure world", and the logger hash value HvL and the block hash value HvB each correspond to "a monitoring hash value". A card reader 15 corresponds to "a storage connection portion", the data storage portion 53 corresponds to "a normal storage processing portion", the hash-value storage portion 54 corresponds to "a secure storage processing portion", and the observer 70 corresponds to "a file monitoring portion". The in-vehicle ECU 100 corresponds to "a data storage device".

Second Embodiment

Figure 7:
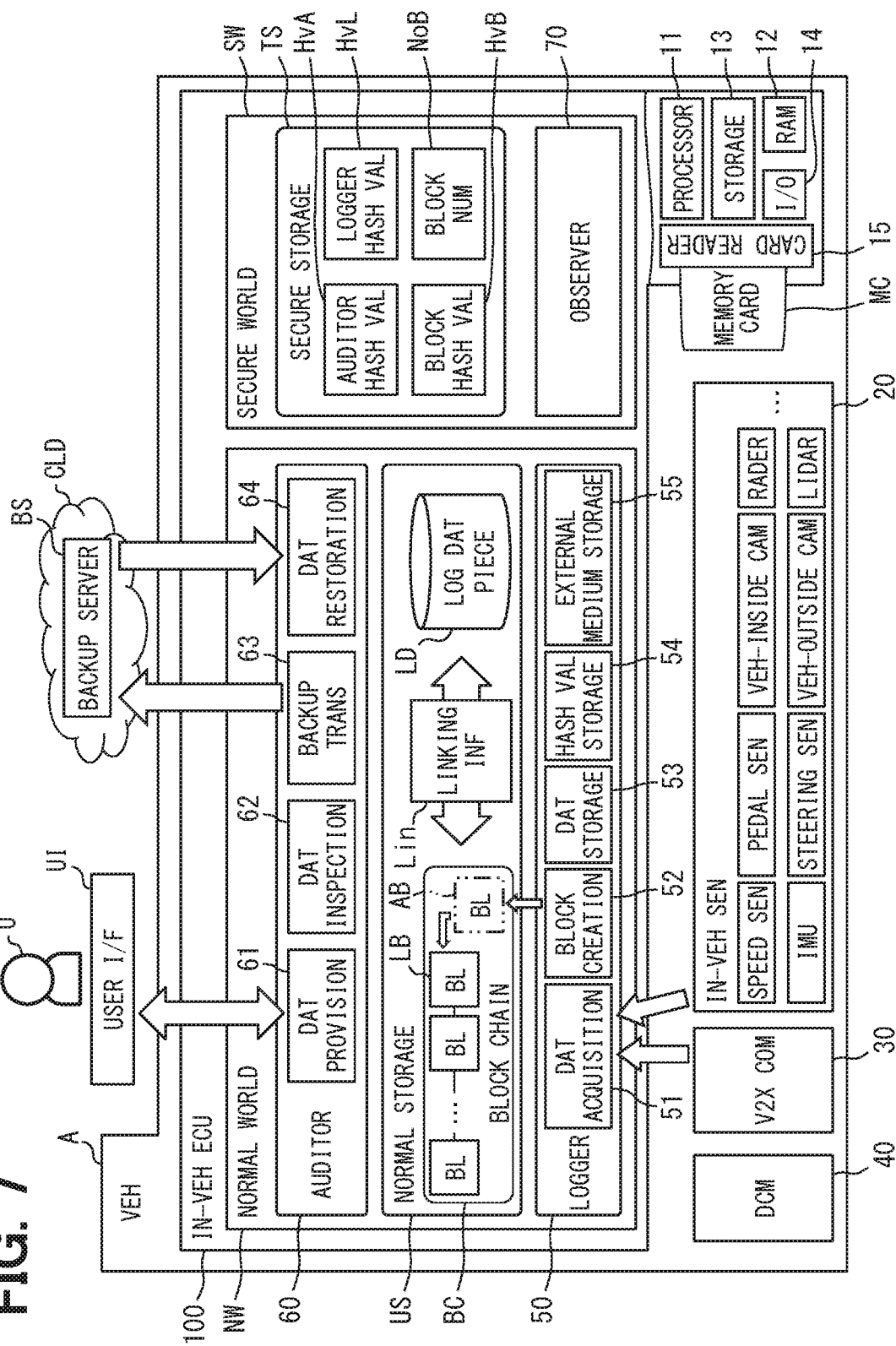

FIG. 7 illustrates a second embodiment of the present disclosure, which is an example of modification of the first embodiment. In the second embodiment, an in-vehicle ECU 100 includes a control circuit which is provided with a card reader 15. The card reader 15 is provided with a slot portion into which a memory card MC is inserted. The memory card MC is a removable medium which is attachable and detachable to and from the card reader 15. The memory card 15 is electrically connected to the card reader 15 and functions as an auxiliary storage device for the control circuit. The card reader 15 is adapted to write data into the memory card MC and to read data from the memory card MC.

A logger 50 is further provided with an external medium storage portion 55. The external medium storage portion 55 is adapted to store log data pieces LD in the memory card MC connected to the card reader 15. The external medium storage portion 55 utilizes a storage area in the memory card MC, as a portion of a normal storage US. When the normal storage US is extended by the memory card MC, log data pieces LD can either be stored in both a storage portion 13 and the memory card MC or be stored only in the memory card MC.

A data inspection portion 62 in an auditor 60 is also capable of inspecting the presence or absence of abnormality such as alteration in the log data pieces LD stored in the memory card MC, using a block hash value HvB. As an example, the data inspection portion 62 reads log data pieces LD stored in the memory card MC, by being triggered by the connection of the memory card MC to the card reader 15. Based on the log data pieces LD read therefrom, the data inspection portion 62 re-calculates the hash values in the order conforming to a blockchain BC, and acquires the hash value for the last block LB.

The data inspection portion 62 determines that the log data pieces LD in the memory card MC are normal, if the re-calculated hash value for the last block LB is coincident with the block hash value HvB in the secure storage TS. On the other hand, if the re-calculated hash value for the last block LB is not coincident with the block hash value HvB in the secure storage TS, the data inspection portion 62 executes abnormality determination indicating that the log data pieces LD in the memory card MC may have been altered.

In the second embodiment as described above, similarly, it is possible to store log data pieces LD while ensuring the reliability thereof, due to the use of the block hash value HvB stored in the secure storage TS.

In addition, in the second embodiment, log data pieces LD can be stored in the memory card MC, and the data inspection portion 62 can inspect the presence or absence of alteration in the log data pieces LD stored in the memory card MC, using the block hash value HvB. With the aforementioned structure, it is possible to extend the storage area for storing log data pieces LD, while preventing degradation of the reliability of the log data pieces LD.

In the second embodiment, the memory card MC corresponds to "an external storage", the card reader 15 corresponds to "a storage connection portion", and the external medium storage portion 55 corresponds to "an external-area storage portion".

Other Embodiments

Although the embodiments of the present disclosure have been described above, the present disclosure should not be understood as being limited to the aforementioned embodiments. The present disclosure can be applied to various embodiments and various combinations thereof, without departing from the spirits of the present disclosure.

In the aforementioned embodiments, the auditor 60 is operated in the normal world NW. However, in a first example of modification of the aforementioned embodiments, the auditor 60 is operated in the secure world SW. If there is leeway in the operational resource of the secure world SW, the auditor 60 can be also placed in the secure world SW, as in the first example of modification, as described above. In this case, it is possible to eliminate the functions of the observer 70 for monitoring the auditor 60.

In a second example of modification of the aforementioned embodiments, the function of transmitting backup data to the backup server BS is eliminated. An in-vehicle ECU 100 having such a configuration can be also incorporated in a vehicle A which is not a connected car. The in-vehicle ECU 100 in the second example of modification is capable of storing backup data in a memory card MC. If abnormality occurs in log data pieces LD in a normal world NW constituted by a storage portion 13, the in-vehicle ECU 100 can restore the log data pieces LD, using the backup in the memory card MC.

In a third example of modification of the aforementioned embodiments, only a portion of acquired data is stored in the state of being linked to a blockchain BC. As in the third example of modification, it is also possible to select log data pieces LD to be stored in a protected state, and log data pieces LD to be stored in an un-protected state, depending on the degree of importance of acquired data. In order to reduce the storage capacity, it is also possible to delete some of log data pieces LD, in the order from oldest data, for example. In addition, in order to reduce the data capacity, an authorized user can be allowed to delete data.

In a fourth example of modification of the aforementioned second embodiment, a storage device connected to an in-vehicle communication network is used as an external storage, instead of the memory card MC. In a fifth example of modification of the aforementioned embodiments, a storage portion in a user's terminal which is paired with an in-vehicle ECU 100 is used as an external storage, instead of the memory card MC. As in the aforementioned fourth and fifth examples of modification, the external storage is not limited to the memory card MC. A data inspection portion 62 is capable of executing inspection processing using a block hash value HvB, with respect to log data pieces LD stored in various types of external media.

In a sixth example of modification of the aforementioned embodiments, the hash values for log data pieces LD are calculated at different timing in logger processing. More specifically, in the logger processing in the sixth example of modification, if it is determined that the number or the capacity of log data pieces LD has reached a specified number or a specified capacity, the respective hash values for all the log data pieces LD to be introduced in a single block are calculated. As described above, after all the log data pieces LD are collected, a flow for calculating the hash values for these data pieces may be executed at once.

Data which can be stored through the data storage device is not limited to text data. Depending on the capacity of the normal storage US, it is also possible to store, therein, sound data, image data, picture data and the like, for example. Data stored in respective blocks in a blockchain BC may be also varied as required.

In the aforementioned embodiments, the hash function used in the in-vehicle ECU 100 is a cryptographic hash function. Such a cryptographic hash function has characteristics as follows. That is, such a cryptographic hash function does not output the same hash value in response to different inputs thereto. Further, such a cryptographic hash function makes it substantially impossible to estimate an input thereto from a hash value output therefrom. It is also possible to employ the respective algorisms of SHA-1, SHA-2, and SHA-3, depending on the required output length (the number of bits), instead of the aforementioned SHA-256, which is one of SHA-2s.

The vehicle A incorporating the in-vehicle ECU 100 can be an owner car which is personally owned by a certain owner and is expected to be used by the owner or the like. By applying the present disclosure to such an owner car, log data pieces LD indicating user's driving history, which are accumulated in a state of being protected from impersonation, are highly valuable for service providers who determine insurance fees according to driving conditions, for example.

The vehicle incorporating the in-vehicle ECU 100 may be also a vehicle as a rental car, a vehicle as a manned taxi, a vehicle for ride sharing, a freight vehicle, a bus, or the like. The in-vehicle ECU 100 may be also incorporated in a driver-less vehicle for use in mobility services. Along with the spread of mobility services in the future, it is expected that the importance of log data pieces LD accumulated in the in-vehicle ECU 100 will be further increased.

An ECU having the functions of a data storage device can be also incorporated in a mobile body which is different from a vehicle. For example, such an ECU having the functions of a data storage device can be incorporated in a heavy machine for use in workplaces, driving play equipment placed in an amusement facility or the like, a railway vehicle, a tram, an airplane, or the like.

In the aforementioned embodiments, the respective functions provided by the in-vehicle ECU 100 can be also provided by software and hardware for executing the software, only software, only hardware, and complex combinations of them. In cases where these functions are provided by electronic circuits as hardware, the respective functions can be also provided by analog circuits or digital circuits which include a large number of logic circuits.

In the aforementioned embodiments, the respective processors may include at least one operational core, such as a CPU (Central Processing Unit) or a GPU (Graphics Processing Unit). The processors may also further include an IP core and the like which include FPGAs (Field-Programmable Gate Arrays) and other dedicated functions.

It is also possible to change, as required, the configuration of the storage medium for storing the respective programs relating to the data storage method according to the present disclosure, which is used as the storage portion according to the aforementioned embodiments. For example, as in the aforementioned second embodiment, the storage medium is not limited to a structure provided on a circuit board, and the storage medium may be also provided in the form of a memory card or the like, which is adapted to be inserted in a slot portion and to be electrically connected to a bus in a computer. The storage medium may be also constituted by an optical disk which forms a source of programs to be copied into a computer, a hard disk drive therefor, and the like.

The controllers and methods described in the present disclosure may be implemented by a special purpose computer generated by configuring a memory and a processor programmed to execute one or more particular functions embodied in computer programs. Alternatively, the controllers and methods described in the present disclosure may be implemented by a special purpose computer generated by configuring a processor provided by one or more special purpose hardware logic circuits. Alternatively, the controllers and methods described in the present disclosure may be implemented by one or more special purpose computers generated by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data storage device in a vehicle comprising:
   a data receiver for receiving a data acquired in the vehicle, the data including at least a detection data detected by at least one of a speed sensor, a pedal sensor, an in-vehicle camera, a radar, an acceleration sensor, s steering sensor, and a lidar in the vehicle;
   a normal storage processing unit having a normal storage area for storing an acquired data;

a block generator for generating a new block having: a hash value of a last block coupled at last to a blockchain; and a hash value of the acquired data; and a secure storage processing unit having a secure storage area for storing a hash value of the new block as a block hash value, the secure storage processing unit being independent from the normal storage processing unit so that access to the secure storage processing unit is restricted from the normal storage processing unit;

wherein the data further includes driving score data obtained from an insurance company and travelling distance data.

2. A data storage device in a mobile body for defining a normal world and a secure world where access from the normal world is restricted and for storing a data acquired in the mobile body using a blockchain, the data storage device comprising:

a normal storage processing unit that is configured to store an acquired data in a storage area of the normal world;

a block generator that is configured to generate a new block including a hash value based on a last block coupled at last to the blockchain, and a hash value based on the acquired data;

a secure storage processing unit that is configured to store a hash value based on the new block as a block hash value in a storage area of the secure world;

a backup transmitter that is configured to transmit backup data of the acquired data to an external memory; and a data restorer that is configured to restore the acquired data, using the backup data stored in the external memory when an abnormality occurs in the acquired data.

3. The data storage device according to claim 2, wherein: the normal storage processing unit is configured to store linking information (Lin) relating to linkage between the acquired data and the blockchain in the storage area of the normal world.

4. The data storage device according to claim 2, further comprising:

a data verifier that is configured to receive a reference request for a specific acquired data, and to determine based on the block hash value whether the specific acquired data is falsified, the specific acquired data being supplied to a request source of the reference request as a requested data.

5. The data storage device according to claim 4, wherein: the data verifier is configured to:

specify a specific block linked to the requested data;

recalculate one or more hash values relating to the specific block and one or more blocks coupled after the specific block; and determine that the specific acquired data is not falsified when a recalculated hash value for a current last block is equal to the block hash value of the secure world.

6. The data storage device according to claim 4, wherein: the data verifier is operated in the normal world.

7. The data storage device according to claim 4, further comprising:

an external area storage that is configured to store the acquired data in an external storage connected to a storage connector, wherein:

the data verifier is configured to verifies based on the block hash value whether the acquired data stored in the external storage via the external area storage is falsified.

8. The data storage device according to claim 4, further comprising:

a file monitor that is configured to be operated in the secure world and to determine whether an executable file relating to the data verifier is falsified.

9. The data storage device according to claim 8, wherein: the file monitor is configured to determine whether the executable file relating to at least one of the block generator, the normal storage processing unit, and the secure storage processing unit is falsified.

10. The data storage device according to claim 9, wherein: the storage area of the secure world stores a hash value based on a normal executable file as a monitoring hash value; and the file monitor is configured to determine that the executable file is not falsified when a hash value based on a current executable file is equal to the monitoring hash value.

11. A non-transitory tangible computer readable storage medium comprising instructions being executed by a computer, the instructions including a method in a mobile body for defining a normal world and a secure world where access from the normal world is restricted and for storing a data acquired in the mobile body using a blockchain, the instructions causing at least one processor to execute:

storing an acquired data in a storage area of the normal world;

generating a new block including a hash value based on a last block coupled at last to the blockchain, and a hash value based on the acquired data);

storing a hash value based on the new block as a block hash value, in a storage area of the secure world;

transmitting a backup data of the acquired data to an external memory; and restoring the acquired data, using the backup data stored in the external memory when an abnormality occurs in the acquired data.

* * * * *